United States Patent
Ratcliffe et al.

(10) Patent No.: US 10,670,752 B2
(45) Date of Patent: Jun. 2, 2020

(54) METHOD FOR ITERATIVE INVERSION OF DATA FROM NON-ENCODED COMPOSITE SOURCES

(71) Applicant: CGG SERVICES SA, Massy (FR)

(72) Inventors: Andrew Ratcliffe, Henfield (GB); Graham Conroy, Westerham (GB)

(73) Assignee: CGG SERVICES SAS, Massy (FR)

( * ) Notice: Subject to any disclaimer, the term of this patent is extended or adjusted under 35 U.S.C. 154(b) by 703 days.

(21) Appl. No.: 15/303,617

(22) PCT Filed: Apr. 13, 2015

(86) PCT No.: PCT/IB2015/000795
§ 371 (c)(1),
(2) Date: Oct. 12, 2016

(87) PCT Pub. No.: WO2015/159151
PCT Pub. Date: Oct. 22, 2015

(65) Prior Publication Data
US 2017/0031041 A1     Feb. 2, 2017

Related U.S. Application Data

(60) Provisional application No. 62/016,111, filed on Jun. 24, 2014, provisional application No. 61/979,037, filed on Apr. 14, 2014.

(51) Int. Cl.
*G01V 1/28*     (2006.01)
*G01V 1/30*     (2006.01)
*G01V 99/00*    (2009.01)

(52) U.S. Cl.
CPC .............. *G01V 1/282* (2013.01); *G01V 1/303* (2013.01); *G01V 1/307* (2013.01); *G01V 99/005* (2013.01);
(Continued)

(58) Field of Classification Search
CPC ...... G01V 1/282; G01V 99/005; G01V 1/307; G01V 1/303; G01V 2210/6222; G01V 2210/614
(Continued)

(56) References Cited

U.S. PATENT DOCUMENTS 4,159,463 A    6/1979   Silverman
4,636,956 A    1/1987   Vannier et al.
(Continued)

FOREIGN PATENT DOCUMENTS

CN          103207409 A       7/2013
WO          WO-2012047384 A1 *  4/2012  ............... G01V 1/30

OTHER PUBLICATIONS

Ben-Hadj-Ali et al., "An efficient frequency-domain full waveform inversion method using simultaneous encoded sources", 2011, Geophysics 76.4, pp. R109-R124.*
(Continued)

*Primary Examiner* — Juan C Ochoa
(74) *Attorney, Agent, or Firm* — Patent Portfolio Builders PLLC

(57) ABSTRACT

Recorded seismic data are obtained at a plurality of receivers from a plurality of sources, and a set of sources from the plurality of sources is selected using spatial criteria based on a location of each source such that any two sources in the set of sources are separated by a predefined minimum distance of separation sufficient to reduce cross talk between sources. The set of sources is combined in a non-encoded manner into a composite source, and forward modeling for the composite source is performed to generate a synthetic seismic data set. A composite recorded seismic data set for the
(Continued)

set of sources is determined, and the synthetic seismic data set and composite recorded seismic data set are used to determine a residual seismic data set. Backward modeling generates a gradient update used to generate an updated earth model.

19 Claims, 4 Drawing Sheets

(52) U.S. Cl.
CPC ............... *G01V 2210/614* (2013.01); *G01V 2210/6222* (2013.01)

(58) Field of Classification Search
USPC ........................................................ 703/10, 2
See application file for complete search history.

(56) References Cited

U.S. PATENT DOCUMENTS

| | | | |
|---|---|---|---|
| 4,823,326 A | 4/1989 | Ward | |
| 5,703,833 A | 12/1997 | Allen | |
| 5,924,049 A | 7/1999 | Beasley et al. | |
| 6,545,944 B2 | 4/2003 | de Kok | |
| 6,999,880 B2 | 2/2006 | Lee | |
| 7,859,945 B2 | 12/2010 | Sallas et al. | |
| 8,000,168 B2* | 8/2011 | Eick .................. | G01V 1/005 367/56 |
| 8,169,222 B2 | 5/2012 | Hornbostel et al. | |
| 8,295,124 B2 | 10/2012 | Abma | |
| 8,437,998 B2 | 5/2013 | Routh et al. | |
| 8,538,699 B2* | 9/2013 | Jing .................. | G01V 3/12 702/7 |
| 8,688,381 B2 | 4/2014 | Routh et al. | |
| 9,013,956 B2* | 4/2015 | Hill .................. | G01V 1/282 367/73 |
| 10,012,745 B2* | 7/2018 | Krebs ............... | G01V 1/003 |
| 10,473,817 B2* | 11/2019 | Theune ............. | G01V 1/308 |
| 2008/0189043 A1 | 8/2008 | Anno et al. | |
| 2009/0116337 A1 | 5/2009 | Chiu et al. | |
| 2010/0018718 A1* | 1/2010 | Krebs ............... | G01V 1/28 166/369 |
| 2011/0000678 A1 | 1/2011 | Krebs et al. | |
| 2012/0073825 A1 | 3/2012 | Routh et al. | |
| 2012/0109612 A1 | 5/2012 | Krebs et al. | |
| 2012/0143506 A1 | 6/2012 | Routh et al. | |
| 2012/0147699 A1 | 6/2012 | Dellinger et al. | |
| 2012/0215506 A1 | 8/2012 | Rickett et al. | |
| 2012/0287755 A1* | 11/2012 | Eick .................. | G01V 1/37 367/41 |
| 2012/0316850 A1 | 12/2012 | Liu et al. | |
| 2013/0046474 A1 | 2/2013 | Bittar et al. | |
| 2013/0235697 A1* | 9/2013 | Szydlik ............. | G01V 1/282 367/73 |
| 2014/0293744 A1* | 10/2014 | Zhang .............. | G01V 1/28 367/53 |
| 2016/0187506 A1* | 6/2016 | Ratcliffe .......... | G01V 1/303 702/14 |

OTHER PUBLICATIONS

Warner et al., "Anisotropic 3D Full-Waveform Inversion," Mar. 1, 2013, Geophysics, vol. 78, No. 2, pp. R59-R80.*
Schuster et al., Theory of multi-source cross-talk reduction by phase-encoded statics, 2011, Geophysical Journal International, 184, doi: 10.1111/gji .2011.184.issue-3, pp. 1289-1303.*
Tang et al., "Least-squares migration/inversion of blended data", 2009, Society of Exploration Geophysicists Technical Program Expanded Abstracts, pp. 1-18.*
International Search Report in related International Application No. PCT/IB2015/000795, dated Oct. 9, 2015.
Written Opinion of the International Searching Authority in related International Application No. PCT/IB2015/000795, dated Oct. 9, 2015.
Y. Capdeville, et al., "Towards Global Earth Tomography Using the Spectral Element Method: a Technique Based on Source Stacking", Geophysical Journal International, 2005, vol. 162, pp. 541-554.
Y. Choi et al., "Multisource Waveform Inversion of Marine Streamer Data Using Normalized Wavefiled", Geophysics, vol. 78, No. 5, Sep.-Oct. 2013, pp. R197-R206.
A. Guitton et al., "Attenuating Crosstalk Noise with Simultaneous Source Full Waveform Inversion", Geophysical Prospecting, 2012, vol. 60, pp. 759-768, EAGE.
F.J. Herrmann et al., "Compressive Sensing Applied to Full-wave Form Inversion", 71st EAGE Conference & Exhibition, Amsterdam, The Netherlands, Jun. 8-11, 2009.
J.R. Krebs et al., "Fast Full-wavefield Seismic Inversion Using Encoded Sources", Geophysics, vol. 74, No. 6, Nov.-Dec. 2009, pp. WCC177-WCC188.
X. Li et al., "Fast Randomized Full-waveform Inversion with Compressive Sensing", The University of British Columbia Technical Report, TR-2011-12, Feb. 13, 2012.
P.P. Moghaddam et al., "Randomized Full-waveform Inversion: a Dimensionality-reduction Approach", SEG Technical Program Expanded Abstracts, Jan. 2010.
P. Mora, "Nonlinear Two-dimensional Elastic Inversion of Multioffset Seismic Data", Geophysics, vol. 52, No. 9, Sep. 1987, pp. 1211-1228.
R-E. Plessix et al., "A Land Example of Full Waveform Inversion and Distance Separated Simultaneous Sweeping", 74th EAGE Conference & Exhibition incorporating SPE EUROPEC 2012, Copenhagen, Denmark, Jun. 4-7, 2012.
R-E. Plessix et al., "Full Waveform Inversion and Distance Separated Simultaneous Sweeping: a Study With a Land Seismic Data Set", Geophysical Prospecting, 2012, vol. 60, pp. 733-747, EAGE.
A.A.V.B. Souza et al., "A Comparison of Shot Encoding Schemes Applied to the Full Waveform Inversion Problem", Thirteenth Invernational Congress of the Brazilian Geophysical Society, Aug. 26-29, 2013.
T. Van Leeuwen et al., "Fast Waveform Inversion Without Source Encoding", The University of British Columbia Technical Report, TR-2011-06, Aug. 22, 2011.
B. Wang et al., "Fast Full Waveform Inversion of Multi-shot Seismic Data", SEG Annual Meeting, Denver, Colorado, SEG Technical Program Expanded Abstracts, Jan. 2010.

* cited by examiner

METHOD FOR ITERATIVE INVERSION OF DATA FROM NON-ENCODED COMPOSITE SOURCES

CROSS REFERENCE TO RELATED APPLICATIONS

This application claims priority and benefit from U.S. Provisional Patent Application No. 61/979,037, filed Apr. 14, 2014, for "Method for Iterative Inversion of Data from Non-encoded Composite Sources" and U.S. Provisional Patent Application No. 62/016,111, filed Jun. 24, 2014, for "Method for Iterative Inversion of Marine Towed-Streamer Data Using Non-Encoded Composite Sources". The entire disclosures of which are incorporated in its entirety herein by reference.

TECHNICAL FIELD

Embodiments of the subject matter disclosed herein generally relate to methods and systems for seismic data processing and, more particularly, to mechanisms and techniques for updating earth models using full waveform inversion.

BACKGROUND

Full Waveform Inversion (FWI) updates an earth model by minimizing the difference between modeled and observed seismic data. The significant cost of computing the FWI remains a primary practical limitation, especially in industry applications. This significant cost is driven by determining the solution of the wave equation for every source in the acquired seismic data for a given earth model. This solution is repeated multiple times, because the earth model is updated in an iterative manner.

In general, a solution of the wave equation from the source is referred to as a "forward modeling". Similarly, a solution of the wave equation from the receivers is referred to as a "reverse modeling". An update to the current earth model is obtained by combining the forward and reverse modelings for a given source and receiver acquisition geometry to yield a "gradient" update to the current earth model, i.e., a direction in which to make a perturbation in the earth parameters of the earth model.

The typical workflow in a "sequential source" FWI implementation includes using the current earth model to perform an individual forward modeling for each source in a survey to generate a synthetic data set for each source. A difference is determined between each synthetic data set and a field data set of actual data at each given receiver in the set of receivers to produce a residual data set. A reverse modeling is then performed for the set of data residuals. This yields a "local" contribution to the gradient for the given source. This is repeated for each source. Not every source needs to be used in this update; however, the sources are modeled as individual entities. The "local" gradient contributions from each of these individual sources are combined to give the "total" gradient for this iteration. The "total" gradient is used to determine a direction of a perturbation in the earth parameters of the current earth model, and the current earth model is updated based on the "total" gradient.

These steps are performed iteratively for a given seismic bandpass frequency or frequency block. For example, these steps are repeated until convergence, or until a given maximum number of iterations is achieved. This iterative process to achieve convergence or to conduct a given maximum number of iterations are repeated at various seismic bandpass frequencies, updating the earth model as the process proceeds through the various seismic bandpass frequencies. Therefore, sequential source FWI implementation requires modeling for individual sources, in multiple iterations and multiple frequency blocks, resulting in high computational costs.

SUMMARY

Exemplary embodiments are directed to systems and methods that reduce the overall computational cost, in both fixed receiver geometry arrangements and in arrangements of active receivers that move location for every source, by combining the sources together in a non-encoded manner. This effectively reduces the number of sources and requires the calculation of fewer solutions to the wave equation. A plurality of sources are combined together, forming a composite or simultaneous source while avoiding unwanted cross talk among the individual sources that produces superfluous energy in the gradient that could contaminate the estimated earth model.

In one embodiment, the sources that are combined together in any one composite source are randomly selected in a spatial manner such that the chosen sources in any one composite source are not too close together in the spatial sense. This uses distance to reduce cross talk among the sources. The desired distance of separation can vary depending on the current seismic bandpass frequency being processed. In one embodiment, the sources are selected to have a distance of separation of at least 1 km.

In one embodiment, multiple sources are combined together prior to the forward modeling process. The selection of sources to combine involves choosing a random subset from the available sources. The chosen sources in the random subset are combined in a non-encoded manner, e.g., without convolution by an encoding function. In one embodiment, the sources that are combined together to form a given composite source change from one iteration to the next in a random manner. Therefore, instead of performing the forward and reverse modeling for each source in a survey individually, the sources are combined in each iteration prior to the forward and reverse modeling step in each iteration.

In any iteration, a plurality of sets of sources can be selected from the available sources. Each selected set of sources are combined into a composite source, resulting in a plurality of sets of composite sources, which can be referred to as realizations. Forward and reverse modeling can be done for each of these realizations to give a set of gradient contributions. The gradient contributions for each of the realizations are then combined to give an overall estimate of the total gradient. In one embodiment, the combination of the gradient contributions for each realization is a summation. Alternatively, the gradient contribution from each realization is processed to extract the signal that is present in the gradient contributions from the different realizations. Therefore, the noise, e.g., cross talk and random noise, is removed, while the signal is retained. These processed realizations are then combined to enhance the signal part while reducing the noise part.

Exemplary embodiments represent an extension to non-encoded composite source full waveform inversion (FWI) with a spatially random source selection that is changed at every iteration and that utilizes a minimum spatial source separation between any two sources that is sufficient to prevent cross talk. In one embodiment, a pseudo-random method for the selection of sources in any given set of sources is used. In one embodiment, the random source selection is made with or without replacements or using some hybrid scheme for partial replacement in the random source selection. In one embodiment, the set of sources are identified, and potentially combined, at the data acquisition stage.

In one exemplary embodiment, a method for iterative inversion of composite source data includes obtaining recorded seismic data at a plurality of receivers from a plurality of sources. A set of sources is randomly selected from the plurality of sources using spatial criteria based on a location of each source such that any two sources in the set of sources are separated by a predefined minimum distance of separation sufficient to reduce cross talk between the two sources. In one embodiment, the predefined minimum distance of separation is at least about 1 km. A current seismic bandpass frequency of the recorded seismic data for iterative inversion is selected. The predefined minimum distance of separation is then set based on the current seismic bandpass frequency.

Sources in the set of sources are combined in a non-encoded manner into a composite source, and a current earth model is used to perform forward modeling for the composite source to generate a synthetic seismic data set. A composite recorded seismic data set associated with the set of sources at the receivers is determined. In one embodiment, recorded seismic data traces are summed at each given receiver in the set of receivers from the set of sources.

The synthetic seismic data set and the composite recorded seismic data set are used to determine a residual seismic data set. This includes calculating a difference between the synthetic seismic data set and the composite recorded seismic data set. The current earth model is used to perform backward modeling for the residual seismic data and to generate a gradient update to the current earth model. The current earth model is updated in accordance with the gradient update to generate an updated earth model.

In one embodiment, the method compensates for missing recorded seismic data at one or more of the plurality of receivers from one or more of the plurality of sources.

In one embodiment, the method compensates for missing recorded seismic data by estimating the missing recorded seismic data using sequential source forward synthetic modeling. Alternatively, the missing recorded seismic data are estimated using non-encoded simultaneous source forward synthetic modeling and source separation. In one embodiment, the missing recorded seismic data are estimated using a combination of sequential source forward synthetic modeling with non-encoded simultaneous source forward synthetic modeling and source separation. In one embodiment, the missing recorded seismic data are accounted for using a cross-correlation type objective function with non-encoded simultaneous source full waveform inversion.

In one embodiment, a plurality of sets of sources is randomly selected, and each set of sources is combined in a non-encoded manner to create a plurality of composite sources. In one embodiment, each set of sources in the plurality of sets of sources is separate from and independent of the other sources. In one embodiment, at least one source from the plurality of sources is contained in at least two sets of sources in the plurality of sets of sources.

The current earth model is used to perform forward modeling for each one of the plurality of composite sources to generate a plurality of synthetic seismic data sets, and a composite recorded seismic data set is determined for each one of the plurality of sets of sources. The plurality of synthetic seismic data sets and the plurality of composite recorded seismic data sets are used to determine a plurality of residual seismic data sets, one residual seismic data set for each one of the sets of sources. The current earth model is used to perform backward modeling for each one of the plurality of residual seismic data sets to generate a plurality of gradient contributions and combining the plurality of gradient contributions to obtain the gradient update to the current earth model.

Combining the plurality of gradient contributions includes summing the plurality of gradient contributions. Alternatively, combining the plurality of gradient contributions includes identifying a common signal portion in each gradient contribution and combining only the common signal portions of each gradient contribution to obtain the gradient update and to eliminate portions of each gradient contribution associated with noise.

Exemplary embodiments are also directed to a method for iterative inversion of composite source data. In this method, recorded seismic data are obtained at a plurality of receivers from a plurality of sources, and a current earth model corresponding to an area of the recorded seismic data is iteratively updated. Iteratively updating the current earth model is achieved by performing a plurality of iterations of the following steps. A set of sources from the plurality of sources is randomly selected, and the sources in the set of sources are combined in a non-encoded manner into a composite source. A current earth model is used to perform forward modeling for the composite source to generate a synthetic seismic data set. A composite recorded seismic data set associated with the set of sources is determined, and the synthetic seismic data set and the composite recorded seismic data set are used to determine a residual seismic data set. The current earth model is used to perform backward modeling for the residual seismic data and to generate a gradient update to the current earth model. The current earth model is updated in accordance with the gradient update to generate an updated earth model. A new set of sources is randomly selected for each iteration.

In one embodiment, a pre-determined number of iterations is selected, and the pre-determined number of iterations of the steps are performed. Alternatively, the plurality of iterations is performed until convergence of the updated earth model. In one embodiment, the current earth model corresponding to the recorded seismic data is iteratively updated for each one of a plurality of seismic bandpass frequencies.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
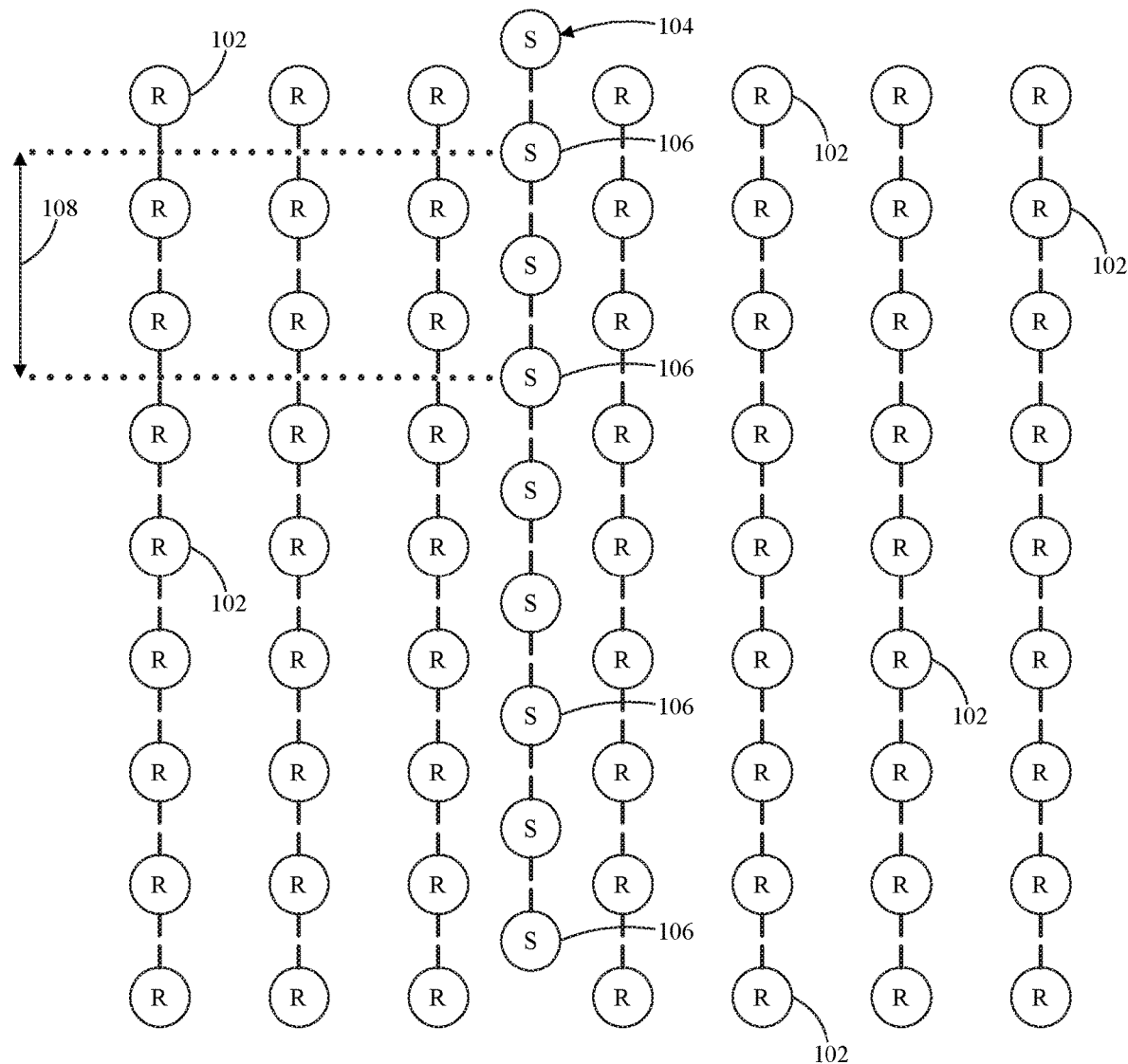
FIG. 1 illustrates an arrangement of seismic sources and seismic receivers in a fixed receiver geometry.

The following description of the embodiments refers to the accompanying drawings. The same reference numbers in different drawings identify the same or similar elements. The following detailed description does not limit the invention. Instead, the scope of the invention is defined by the appended claims. Some of the following embodiments are discussed, for simplicity, with regard to local activity taking place within the area of a seismic survey. However, the embodiments to be discussed next are not limited to this configuration, but may be extended to other arrangements that include regional activity, conventional seismic surveys, etc.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Exemplary embodiments reduce the computational cost of full waveform inversion (FWI) for both fixed receiver geometries and for other types of acquisitions that do not satisfy a fixed receiver geometry such as a marine towed streamer, non-fixed receiver geometry. This reduction in computational cost is achieved while still maintaining the quality of the estimated earth model. The computational cost is reduced by combining the sources prior to solving the wave equation. Maintaining the quality of the estimated earth model is achieved by attenuating the cross talk between sources. In addition for the non-fixed receiver geometries, the detrimental impact of data that are missing is mitigated when combining sources together to form composite sources based on the fixed receiver spread prerequisite.

Reducing the computational time of FWI produces a large commercial advantage by making FWI a faster process and by allowing FWI to be pushed to higher frequencies for the same computational cost. The reduction in computational cost is achieved by reducing the total number of forward and reverse modelings compared to sequential source FWI, by combining together randomly selected sets of sources in a non-encoded manner to form one or more composite sources. This non-encoded simultaneous source FWI method is extended from fixed receiver spread acquisitions, i.e., principally ocean bottom seismic surveys only, to include marine towed-streamer geometries, as well as other types of acquisitions. Examples of these other types of acquisitions include patch-based ocean bottom seismic or land surveys where there are fixed receivers, but only for subsets of the sources, that cannot be classed as strictly fixed spread.

In general, the quality of the estimated earth model is maintained by four factors that attenuate the cross talk, and other artifacts, as the inversion process proceeds. The first factor is the random selection of the sources that are combined together in any one composite source. The second factor changes, in a random manner, the selection of sources that are combined together in any one composite source at every iteration of FWI, or for every iteration of FWI with a given bandpass frequency. The third factor ensures that the chosen sources in any one composite source are not too close together. The fourth factor, which is optional, accommodates non-fixed receiver geometries by compensating for the synthetic missing data that may be used to fulfill the fixed receiver spread requirement for composite sources. This compensation can be conducted one or more times during the iterative inversion process.

Referring initially to FIG. 1, an exemplary seismic data acquisition system 100 containing a plurality of receivers 102 and a plurality of sources 104 is illustrated. Suitable seismic data receivers and seismic data sources are known in the art. In one embodiment, the receivers are arranged in a fixed geometry, such as a grid. The receivers can be land-based ground equipment or marine-based systems, for example, ocean bottom nodes (OBN) that are deployed on the sea floor. In the fixed geometry, the location of each individual receiver is fixed. However, the actual number and arrangement of the receivers can vary and there can be variations in the spacing among the receivers in the fixed geometry grid. The plurality of sources represents a plurality of individual and separate sources or a plurality of source shots produced by one or more sources as those sources move along a line or path through or adjacent to the grid of receivers. Therefore, each source is the location of a source shot, having a known timing and location.

Exemplary embodiments perform an iterative inversion process, e.g., FWI, using a selected set 106 of the plurality of sources. The sources 106 in the set are selected randomly and spatially, to have a minimum distance of separation 108 between any two sources in the set of sources. This minimum distance of separation is sufficient to prevent, or to reduce the amount of, cross talk between any two sources. A given iterative inversion process, which includes a plurality of iterations, is conducted with respect to the plurality of receivers 102. In addition, a given iterative process can be conducted with respect to the selected frequency band in the recorded seismic data. The set of sources can be completely changed, i.e., a new set of sources is randomly selected, for each iteration. Alternatively, only a portion of the sources in a given set of sources is changed between iterations. Even when a complete new set of sources are randomly selected, individual sources can be selected for the new set of sources that were also contained in the old set of sources.

Figure 2:
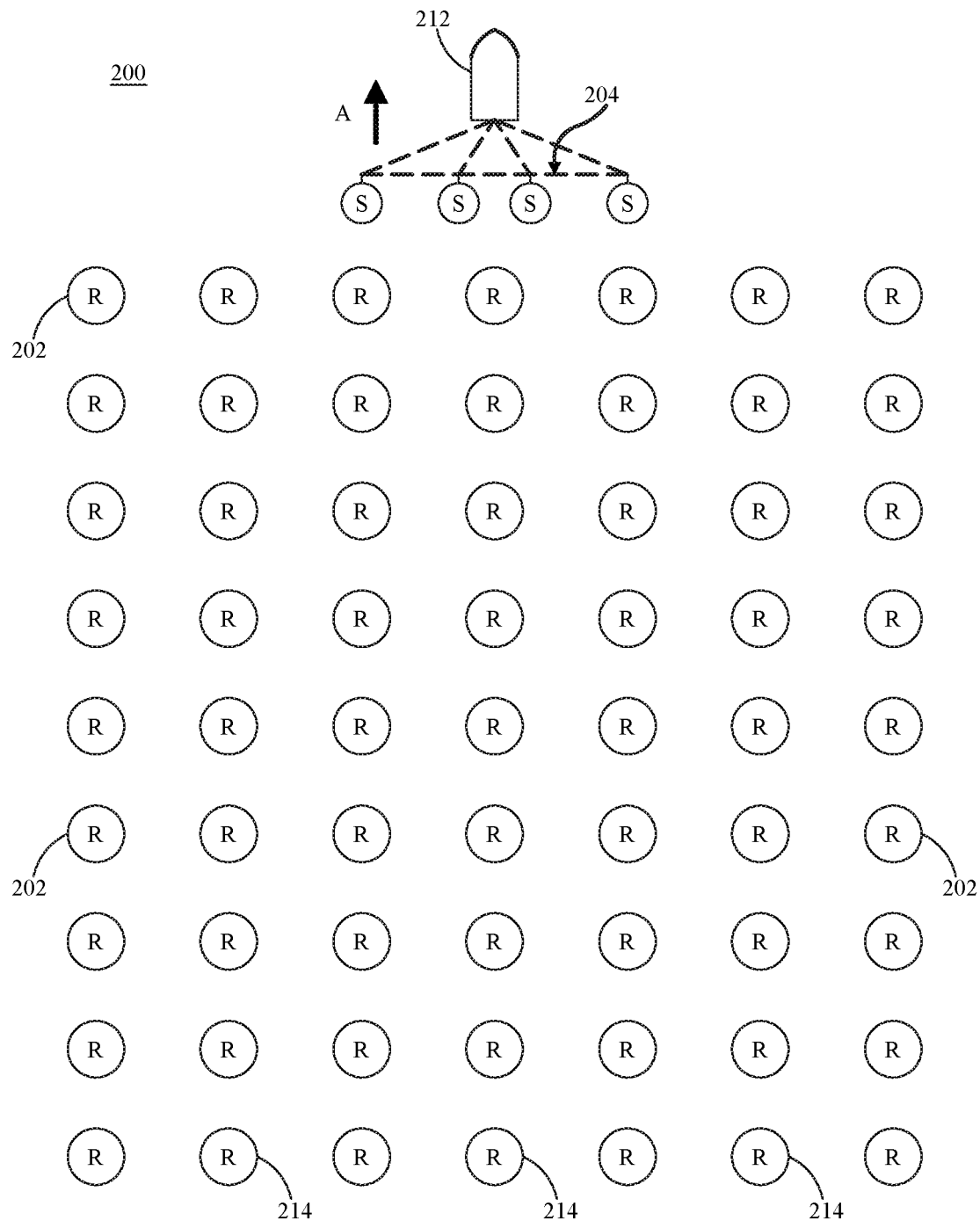
FIG. 2 illustrates an arrangement of a marine towed streamer seismic data acquisition system with a non-fixed receiver geometry.

Referring to FIG. 2, an exemplary seismic data acquisition system 200 containing a plurality of receivers 202 having a non-fixed geometry is illustrated. The receivers are attached to and pulled through the water by a vessel 212 in the direction of arrow A. Therefore, all of the receivers are moving in the direction of arrow A. Given the arrangement of receivers on long tow lines in combination with wind and waves, the receivers may also be moving or shifting in directions other than parallel to arrow A including perpendicular to arrow A.

The acquisition system also includes one or more shot generators 204 that are also pulled by the vessel in the direction of arrow A. As these shot generators are activated or fired, each one generates a plurality of sources along a given line, similar to the line of sources illustrated in FIG. 1. With four source generators. Four generally parallel lines of sources are generated. Any given set of sources can be selected from any of the generated sources in any of the lines or shot lines. As the receivers are moving with respect to the generated sources, certain physical receiver locations 214 may not receive seismic trace data for one or more of the generated sources. This represents a hole in the recorded seismic data, and exemplary embodiments compensate for this missing seismic data when conducting the inversion process.

Figure 3:
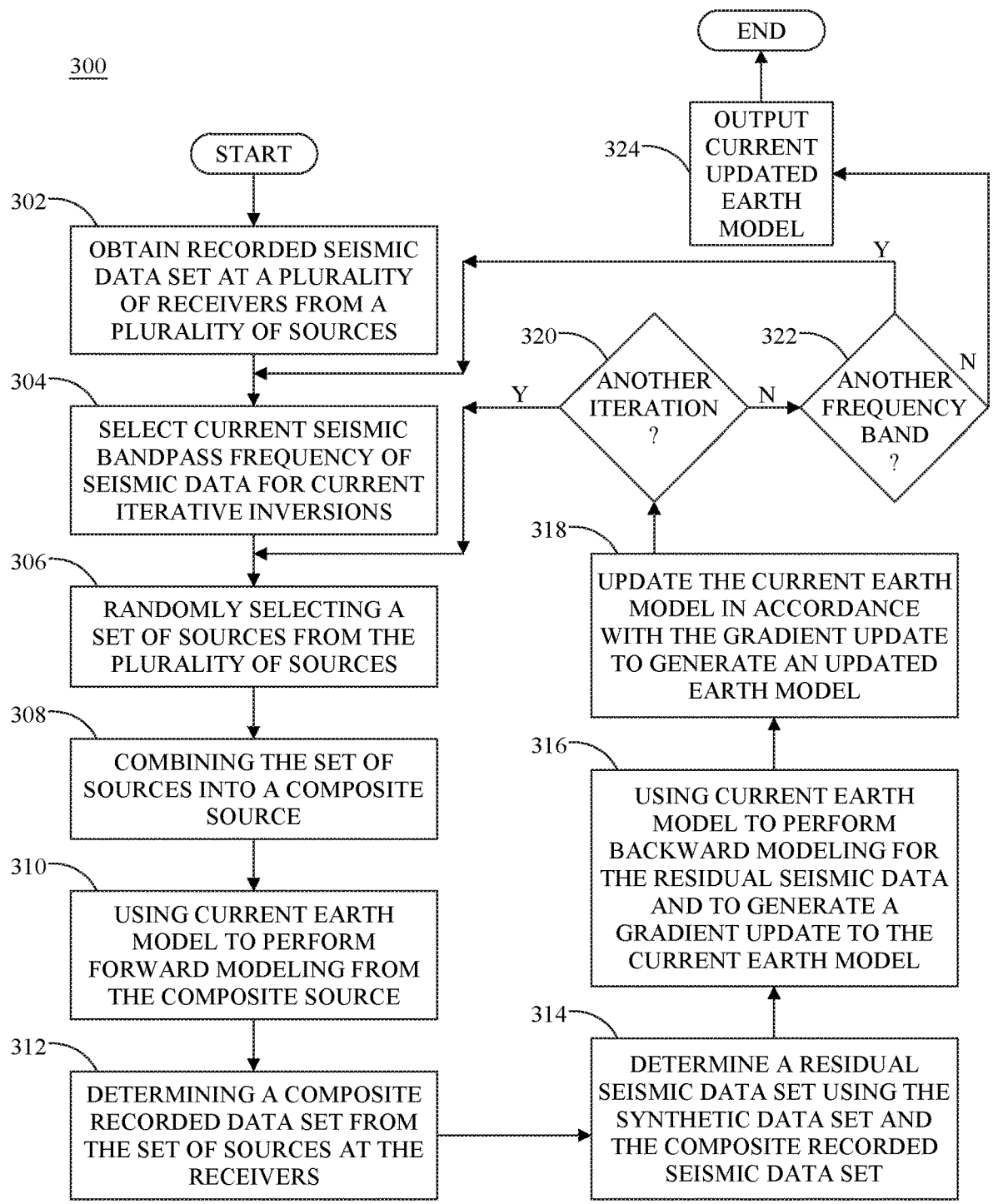
FIG. 3 is a flowchart of an embodiment of a method for non-encoded, composite source iterative inversion of seismic data in accordance with the present invention.

Referring to FIG. 3, one exemplary embodiment is directed to a method for iterative inversion of composite source data 300. A recorded seismic data set at a plurality of receivers from a plurality of sources is obtained 302. A current seismic bandpass frequency of the recorded seismic data for the current iterative inversion is selected 304. The current iterative inversion contains one or a plurality of iterations at this selected frequency band.

A set of sources is selected from the plurality of sources 306 for the current iteration. The sources are selected both at random and spatially based on the physical location of the shots such that any two sources are separated by a predefined minimum distance of separation. In one embodiment, this predefined minimum distance of separation is at least about 1 km. alternatively; the predefined minimum distance of separation is based on the current seismic bandpass frequency associated with the current iterative inversion.

All of the sources in the set of sources are combined into a single composite source 308. These sources are combined in a non-encoded manner, e.g., without convolution by an encoding function. A current earth model corresponding to the area covered by the recorded seismic data is used to perform forward modeling for the composite source 310. This generates a synthetic seismic data set. A composite recorded seismic data set from the set of sources, i.e., from the composite source, is determined at the receivers 312. The synthetic seismic data set and the composite recorded seismic data set are used to determine a residual seismic data set 314. In one embodiment, this residual seismic data set is determined by calculating a difference between the synthetic seismic data set and the composite recorded seismic data set. Alternative methods can also be used for comparing synthetic and recorded seismic data.

Having determined the residual seismic data set, the current earth model is used to perform backward modeling for the residual seismic data and to generate a gradient update to the current earth model 316. This gradient update is a direction of perturbation in one or more earth parameters within the current earth model. The current earth model is updated in accordance with the gradient update to generate an updated earth model 318. This updated earth model is then used as the current earth model in subsequent iterations. In one embodiment, methods can be used that do not require the use of a gradient for updating the earth model parameters, for example, a global inversion scheme.

A determination is made regarding whether another iteration is to be conducted for the current iterative inversion 320. If another iteration is desired, then a new set of sources is randomly selected from the plurality of sources, and the iterative inversion repeats to generate another updated earth model. The iterative inversion process is repeated for a desired number of iterations. In one embodiment, this desired number of iterations is a predetermined number of iterations. Alternatively, the desired number of iterations is the number of iterations required until some convergence criterion is achieved.

If another iteration is not desired, then a determination is made regarding whether another frequency band is to be selected for an iterative inversion process 322. If another frequency band is desired, a new current seismic bandpass frequency is selected, and the iterative inversion process is repeated for this frequency band. In general, the iterative inversion process is repeated for a plurality of seismic bandpass frequencies. If a new frequency band is not to be selected, then the current updated earth model is output 324.

In addition to selecting a single set of sources, a plurality of sets of sources can also be selected in a given iteration or during each iteration of the iterative inversion process. Selection of any given set of sources is separate from and is independent of, or may be partially dependent on, the selection of other sets of sources. The resulting sets of sources can overlap partially or can be completely separate and independent sets in that the sets do not overlap or have sources in common As with the selection of a single set of sources, the plurality of sets of sources can be selected iteratively, changing with each iteration. The random source selection can be made with or without replacements or using a hybrid scheme for partial replacement in the random source selection. In one embodiment, the selection of sources is not changed at every iteration but, for example, only at every other iteration, or only at the start of each new set of iterations when inverting a different frequency band. In one embodiment, the composite sources are formed at the seismic data acquisition stage.

Having selected the plurality of sets of sources, each set of sources in the plurality of sets of sources is combined into a composite source. Each set of sources is combined in a non-encoded manner, e.g., without convolution by an encoding function. This results in a plurality of composite sources, which can be referred to as realizations. Forward modeling is performed for each one of the plurality of composite sources or realizations to generate a plurality of synthetic seismic data sets. A composite recorded seismic data set is determined for each one of the plurality of sets of sources at the set of receivers. The plurality of synthetic seismic data sets and the plurality of composite recorded seismic data sets are used to determine a plurality of residual seismic data sets, one residual seismic data set for each one of the sets of sources.

The current earth model is then used to perform backward modeling for each one of the plurality of residual seismic data sets to generate a plurality of gradient contributions. These gradient contributions are combined to achieve the gradient update to the current earth model. In one embodiment, the gradient contributions are added together to create the gradient update. In another embodiment, a common signal portion is identified in each gradient contribution, and only these common signal portions are combined. This eliminates portions associated with noise.

The non-encoded composite source inversion process can be combined with the encoded composite source FWI, with sequential source FWI or with a generalized source FWI. Generalized sources are sources that have been combined such that they form a specific coherent shape of a wavefront, for example, a plane wave. These combinations use a mixture of the different techniques, either over a number of iterations, over sets of iterations or within the same iteration to obtain a set of different gradient estimates for combining. In one embodiment, reciprocity is used in order that the actual receivers are treated as computational sources, which is beneficial in terms of reducing computation cost, in cases such as when the source sampling is denser than the receiver sampling. In one embodiment, the recorded seismic data set may be interpolated, using a suitable multi-dimensional interpolation algorithm, onto a plurality of new source and/or receiver positions; the resulting interpolated data, and corresponding interpolated source and/or receiver positions, subsequently being used in the composite source inversion process.

The non-encoded simultaneous source inversion process has been described with respect to a fixed receiver spread for all of the sources as is found, for example, in ocean bottom seismic and certain land acquisitions where all sources are always recorded at all receiver positions on at least a per-swath basis. For marine towed-streamer data, the active receivers move location for every source. Therefore, a physical receiver location on the Earth's surface will be missing data for some sources, as locations fall off the end of the streamer tow.

In applying the non-encoded simultaneous source inversion method in the marine towed-streamer case, extensions to fixed receiver geometry embodiments are used to account for missing data in the inversion. In general, four methods are used to compensate for missing seismic traces in the recorded seismic data. These methods constitute additional processing steps that are performed before or within the framework of the non-encoded simultaneous source inversion algorithm described above. These additional processing steps are also valid for other survey types that cannot be treated as strictly of fixed spread, for example, a patch-based ocean bottom seismic or land survey where there are fixed receivers for subsets of sources.

For any one of the four methods of compensating for missing seismic data, missing recorded seismic data at one or more of the plurality of receivers is identified. In a first method, missing data are estimated using sequential source forward synthetic modeling. In a second method, missing data are estimated using non-encoded simultaneous source forward synthetic modeling and source separation. In a third method, missing data are estimated using a hybrid of using sequential source forward synthetic modeling with non-encoded simultaneous source forward synthetic modeling and source separation. In a fourth method, a cross-correlation type objective function within non-encoded simultaneous source FWI is used.

In one embodiment, a combination of the first and second methods are used during the course of the inversion, alternating the method used at each iteration or at the start of each new set of iterations when inverting a different frequency band. In one embodiment, the fourth method is used in combination with any one or more of the first three methods.

In the first method for compensating for missing recorded seismic data, sequential source forward synthetic modeling is used. The recorded seismic data set from the plurality of sources at the plurality of receivers is processed to identify the offset data missing from the recorded seismic data set, i.e., the marine towed streamer data set being used as the input to the inversion. An initial forward modeling step is performed using the current earth model to generate a set of synthetic traces corresponding to the missing offset data. This forward modeling is carried out either in a conventional sequential source manner or via a forward modeling of non-encoded composite sources followed by simultaneous source separation.

In one embodiment, the synthetic missing offset data is processed to improve the level of conformity with the real recorded seismic data, e.g., application of any necessary bandpass filtering or consistent trace muting. The synthetic missing offset seismic data set is merged with the incomplete real recorded seismic data set. The resulting corrected seismic data set is used in composite source inversion. In one embodiment, the synthetic offset data are regenerated one or more times during the course of the iterative inversion process using the interim updated velocity model, for example, every ten iterations or upon every change of inversion frequency band. This will progressively diminish any remnant signature of the initial current earth model that may be present in the iterative updated earth models due to the inclusion of the synthetic seismic traces in the inversion generated from the initial current earth model, which satisfies the fixed receiver assumption for composite sources.

In the second method for compensating for missing seismic data in the recorded seismic data set, missing data are estimated via non-encoded simultaneous source forward synthetic modeling and source separation. In this method, forward modeling for the composite source or sources is conducted, which results in a set of one or more non-encoded simulated composite source gathers. Simultaneous source separation is performed using a source separation algorithm to yield simulated sequential gathers. The resulting simulated sequential synthetic gathers are processed to conform with the real recorded seismic data, e.g., using offset limitation, bandpass or other filtering, muting of missing traces or regions of the gathers, such that the processing steps applied to the simulated sequential synthetic gathers agree with those applied to the real recorded seismic data.

The residual differences of these processed synthetic gathers are computed with respect to the real recorded gathers. In one embodiment, the real recorded gathers from the recorded seismic data set are substituted with the 'round-trip' result of combining to form non-encoded composite real data gathers, followed by a simultaneous source separation back to sequential gathers using the same source separation algorithm as was used for the simulated data. The resulting (sequential) residual difference gathers are recombined back together to form non-encoded composite gathers ready for the reverse modeling step for the receivers.

In one embodiment, the processed synthetic gathers are recombined back together to form non-encoded processed composite simulated source gathers. In addition, the real recorded gathers are combined together to form non-encoded composite real data gathers. The residual differences of the processed composite synthetic gathers are computed with respect to the composite real data gathers. The resulting (non-encoded) composite residual difference gathers are used as the input for the reverse modeling step for the receivers.

In one embodiment, the synthetic data identified as missing from the real recorded data are combined to form non-encoded composite simulated missing data gathers. The real recorded gathers are also combined together to form non-encoded composite real data gathers. The residual differences of the composite synthetic gathers are computed with respect to the composite real data gathers, which will be incorrect due to the missing data in the real gathers supplied as input to the iterative inversion. The composite simulated missing data gathers are subtracted from the composite residual difference gathers to generate corrected composite residual difference gathers. The resulting non-encoded corrected composite residual difference gathers are used as the input for the reverse modeling step for the receivers.

In one embodiment, the real recorded seismic data input gathers are combined together to form the corresponding set of non-encoded composite real data gathers following the forward modeling step for the non-encoded composite sources, which results in a set of one or more non-encoded simulated composite source gathers. The residual differences of the composite synthetic gathers are computed with respect to the composite real recorded seismic data gathers, which will be incorrect due to the missing data in the real gathers supplied as input to the iterative inversion. Simultaneous source separation is performed using a source separation algorithm to yield sequential residual data gathers. Residual data identified as corresponding to missing data in the real recorded data are combined to form non-encoded composite missing data gathers. The composite missing data gathers are subtracted from the composite residual difference gathers to generate corrected composite residual difference gathers. The resulting (non-encoded) corrected composite residual difference gathers are used as the input for the reverse modeling step for the receivers.

In the third method for compensating for missing recorded seismic data, non-encoded simultaneous and sequential source methods are used. Initially, a shallow time window of the data is inverted using non-encoded composite source FWI where the fixed receiver condition is satisfied in order to obtain an update to the initial shallow earth model. Subsequently, a sparse sequential source FWI is performed, i.e., exploiting the concept conventionally termed as "shot-skipping", for the deeper time window of the data using the previously obtained shallow time window model as the new starting model.

In one embodiment, forward modeling is used through the obtained shallow time window model to simulate missing far offset data in the real seismic data set input to the inversion, producing a data set satisfying the fixed receiver requirement for non-encoded composite source FWI. Forward modeling is carried out either in a conventional sequential source manner or via a forward modeling of non-encoded composite sources and subsequent simultaneous source separation, followed by appropriate processing (e.g. offset muting) of the sequential simulated gathers. Then the non-encoded composite source FWI method for fixed receiver-spread geometries is conducted as described above.

In the fourth method, a cross-correlation type objective function is used within non-encoded simultaneous source FWI. In this method, the non-encoded composite source FWI method for the fixed receiver geometry is utilized to generate (non-encoded) synthetic composite source gathers. Then an objective function is employed in the inversion that measures the cross-correlation between these (non-encoded) synthetic composite source gathers in the fixed receiver geometry case and the (non-encoded) composite real data gathers. A property of a cross-correlation objective function is such that the contribution of missing data is reduced in the inversion.

Methods and systems in accordance with exemplary embodiments can be hardware embodiments, software embodiments or a combination of hardware and software embodiments. In one embodiment, the methods described herein are implemented as software. Suitable software embodiments include, but are not limited to, firmware, resident software and microcode. In addition, exemplary methods and systems can take the form of a computer program product accessible from a computer-usable or computer-readable medium providing program code for use by or in connection with a computer, logical processing unit or any instruction execution system. In one embodiment, a machine-readable or computer-readable medium contains a machine-executable or computer-executable code that when read by a machine or computer causes the machine or computer to perform method for iterative inversion of composite source data in accordance with exemplary embodiments and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages.

As used herein, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums and include non-transitory computer-readable mediums. Suitable computer-readable mediums include, but are not limited to, a semiconductor or solid state memory, magnetic tape, a removable computer diskette, a random access memory (RAM), a read-only memory (ROM), a rigid magnetic disk and an optical disk. Suitable optical disks include, but are not limited to, a compact disk-read only memory (CD-ROM), a compact disk-read/write (CD-R/W) and DVD.

Figure 4:
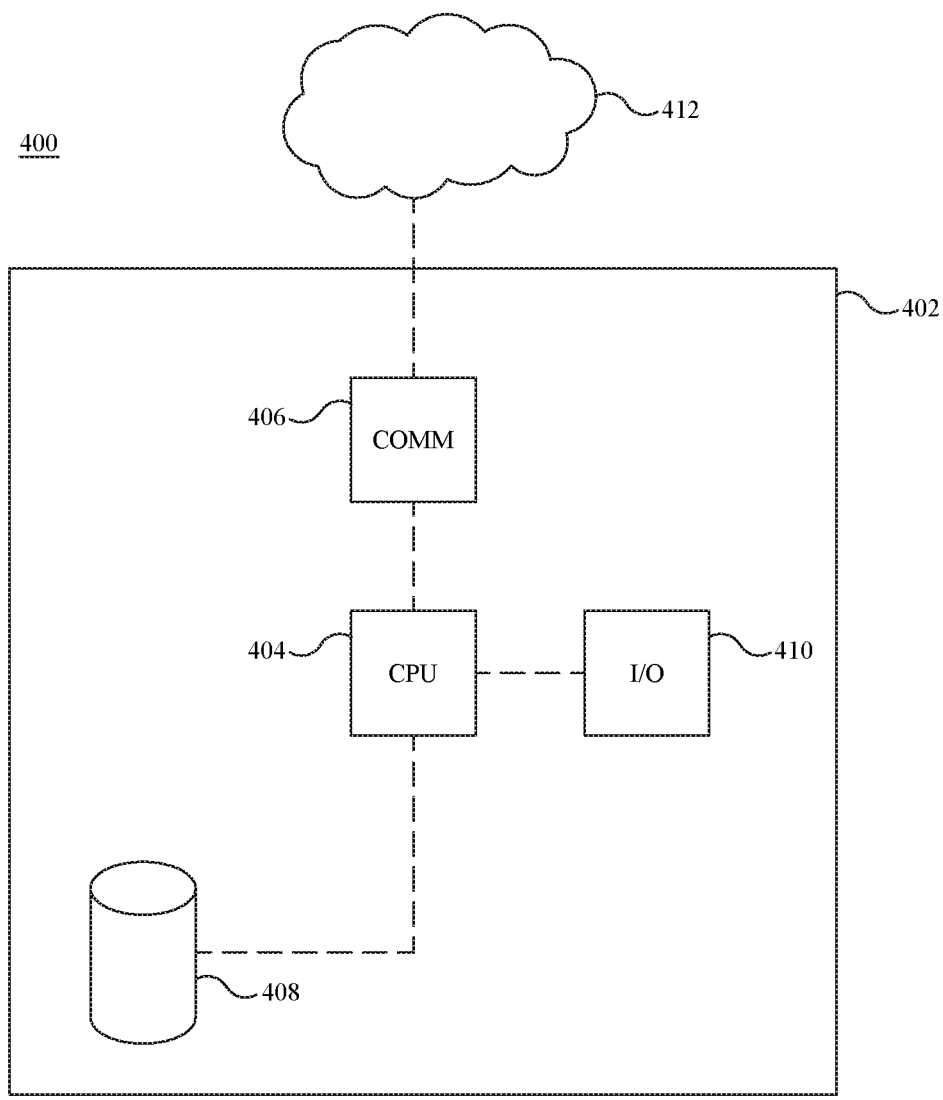
FIG. 4 illustrates an exemplary data processing device or system which can be used to implement the methods.

In one embodiment, a computing device for performing the calculations as set forth in the above-described embodiments may be any type of computing device capable of processing and communicating seismic data associated with a seismic survey. An example of a representative computing system capable of carrying out operations in accordance with these embodiments is illustrated in FIG. 4. The computing system 400 includes a computer or server 402 having one or more central processing units 404 in communication with a communication module 406, one or more input/output devices 410 and at least one storage device 408. All of these components are known to those of ordinary skill in the art, and this description includes all known and future variants of these types of devices. The communication module provides for communication with other computing systems, databases and data acquisition systems across one or more local or wide area networks 412. This includes both wired and wireless communication. Suitable input-output devices include keyboards, point and click type devices, audio devices, optical media devices and visual displays.

Suitable storage devices include magnetic media such as a hard disk drive (HDD), solid state memory devices including flash drives, ROM and RAM and optical media. The storage device can contain data as well as software code for executing the functions of the computing system and the functions in accordance with the methods described herein. Therefore, the computing system 400 can be used to implement the methods described above associated with the calculation of the induced source shot gather. Hardware, firmware, software or a combination thereof may be used to perform the various steps and operations described herein.

The disclosed exemplary embodiments provide a computing device, software and method for iterative inversion of composite source data. It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software, or firmware tangibly embodied in a computer-readable storage medium for execution by a geo-physics dedicated computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for iterative inversion of composite source data, the method comprising:
   obtaining recorded seismic data at a plurality of receivers from a plurality of sources;
   iteratively updating a current earth model corresponding to an area of the recorded seismic data until a predetermined criterion is met:
      randomly selecting a set of sources from the plurality of sources such that any two sources in the set of sources are separated by a predefined minimum distance of separation sufficient to reduce cross talk between the two sources;
      combining the set of sources in a non-encoded manner into a composite source;
      using the current earth model to perform forward modeling for the composite source to generate a synthetic seismic data set;
      determining a composite recorded seismic data set associated with the set of sources from the seismic data recorded at the receivers;
      using the synthetic seismic data set and the composite recorded seismic data set to determine a residual seismic data set;
      using the current earth model to perform backward modeling for the residual seismic data set and to generate a gradient update to the current earth model; and
      updating the current earth model in accordance with the gradient update to generate an updated earth model,
   wherein a new set of sources is randomly selected for each iteration.

2. The method of claim 1, wherein the predefined minimum distance of separation is at least 1 km.

3. The method of claim 1, wherein determining the composite recorded seismic data set comprises summing recorded seismic data traces at each given receiver in the plurality of receivers from the set of sources.

4. The method of claim 1, wherein using the synthetic seismic data set and the composite recorded seismic data set to determine a residual seismic data set comprises calculating a difference between the synthetic seismic data set and the composite recorded seismic data set.

5. The method of claim 1, wherein for at least one iteration:
   the randomly selecting the set of sources further comprises randomly selecting a plurality of sets of sources;
   the combining of the set of sources further comprises combining each set of sources in the plurality of sets of sources in a non-encoded manner to create a plurality of composite sources;
   the using of the current earth model to perform forward modeling further comprises using the current earth model to perform forward modeling for each one of the plurality of composite sources to generate a plurality of first synthetic seismic data sets;
   the determining of the composite recorded seismic data set further comprises determining a composite recorded seismic data set for each one of the plurality of sets of sources;
   the using of the synthetic seismic data set and the composite recorded seismic data set to determine the residual seismic data set further comprises using the plurality of first synthetic seismic data sets and the plurality of composite recorded seismic data sets to determine a plurality of residual seismic data sets, one residual seismic data set for each set of the plurality of sets of sources; and
   the using of the current earth model to perform backward modeling further comprises using the current earth model to perform backward modeling for each one of the plurality of residual seismic data sets to generate a plurality of gradient contributions and combining the plurality of gradient contributions to obtain the gradient update to the current earth model.

6. The method of claim 5, wherein each set of sources in the plurality of sets of sources is separate from and independent of the other sources.

7. The method of claim 5, wherein at least one source from the plurality of sources is contained in at least two sets of sources in the plurality of sets of sources.

8. The method of claim 5, wherein combining the plurality of gradient contributions comprises summing the plurality of gradient contributions.

9. The method of claim 5, wherein combining the plurality of gradient contributions comprises:
   identifying a common signal portion in each gradient contribution; and
   combining only the common signal portions of each gradient contribution to obtain the gradient update and to eliminate portions of each gradient contribution associated with noise.

10. The method of claim 1, further comprising compensating for missing recorded seismic data at one or more of the plurality of receivers from one or more of the plurality of sources.

11. The method of claim 10, wherein compensating for missing recorded seismic data comprises estimating the missing recorded seismic data using sequential source forward synthetic modeling.

12. The method of claim 10, wherein compensating for missing recorded seismic data comprises estimating the missing recorded seismic data using non-encoded simultaneous source forward synthetic modeling and source separation.

13. The method of claim 10, wherein compensating for missing recorded seismic data comprises estimating the missing recorded seismic data using a combination of sequential source forward synthetic modeling with non-encoded simultaneous source forward synthetic modeling and source separation.

14. The method of claim 10, wherein compensating for missing recorded seismic data comprises accounting for the missing recorded seismic data using a cross-correlation type objective function with non-encoded simultaneous source full waveform inversion.

15. The method of claim 1, wherein the predetermined criterion is a number of iterations and the method further comprises selecting a pre-determined number of iterations.

16. The method of claim 1, wherein the predetermined criterion is convergence of the updated earth model.

17. The method of claim 1, wherein the method further comprises iteratively updating the current earth model corresponding to the recorded seismic data for each one of a plurality of seismic bandpass frequencies.

18. The method of claim 17, wherein the method further comprises:
   setting the predefined minimum distance of separation between the two sources based on the current seismic bandpass frequency.

19. A non-transitory computer-readable storage medium containing a computer-readable code that when read by a computer causes the computer to perform a method for iterative inversion of composite source data, the method comprising:
   obtaining recorded seismic data at a plurality of receivers from a plurality of sources;
   iteratively updating a current earth model corresponding to an area of the recorded seismic data until a predetermined criterion is met:
      randomly selecting a set of sources from the plurality of sources such that any two sources in the set of sources are separated by a predefined minimum distance of separation sufficient to reduce cross talk between the two sources;
      combining the set of sources in a non-encoded manner into a composite source;
      using the current earth model to perform forward modeling for the composite source to generate a synthetic seismic data set;
      determining a composite recorded seismic data set associated with the set of sources from the seismic data recorded at the receivers;
      using the synthetic seismic data set and the composite recorded seismic data set to determine a residual seismic data set;
      using the current earth model to perform backward modeling for the residual seismic data set and to generate a gradient update to the current earth model; and
      updating the current earth model in accordance with the gradient update to generate an updated earth model,
   wherein a new set of sources is randomly selected for each iteration.

* * * * *